Oct. 30, 1928.
E. F. BLISS
1,689,516
REMOTE CONTROL SYSTEM
Filed May 9. 1924
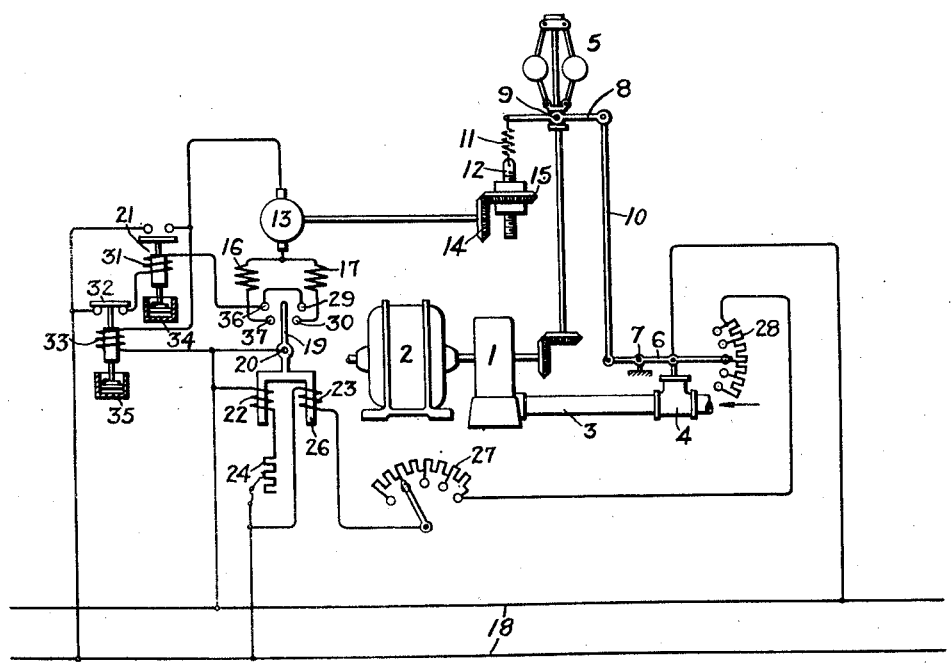
Inventor:
Elmer F. Bliss;
by
His Attorney Patented Oct. 30, 1928.

1,689,516

UNITED STATES PATENT OFFICE.

ELMER F. BLISS, OF SCHENECTADY, NEW YORK, ASSIGNOR TO GENERAL ELECTRIC COMPANY, A CORPORATION OF NEW YORK.

REMOTE-CONTROL SYSTEM.

Application filed May 9, 1924. Serial No. 712,171.

My invention relates to remote control systems, and has for its object the provision of an improved system for controlling in an accurate and reliable manner the actuation of a device which is apt to over-travel.

For purposes of illustration and explanation, my invention will be shown as utilized in conunction with a turbine governor to control the adjustment of the turbine gate. It will be apparent, however, that it is capable of use in the control of rheostats by which the operation of electric machines is controlled and in many other connections where accurate control and adjustment of a device are required. In accordance with my invention, the motor or other means for actuating the device to be controlled is intermittently energized to insure a close relation between the movement of the control means and that of the device to be controlled.

My invention will be better understood on reference to the following description when considered in connection with the accompanying drawing and its scope will be pointed out in the appended claims.

Referring to the drawing, the single figure thereof shows a turbine 1 coupled to a dynamo electric machine 2 and arranged to be supplied with operating fluid through a pipe 3 and an automatically operated valve or gate 4 by which the fluid supply is controlled in accordance with the speed of the turbine governor 5. The valve 4 and governor 5 are interconnected through a lever 6 pivoted at 7, a lever 8 pivoted to the governor 5 at 9, and a lever 10 arranged to interconnect the levers 6 and 8. At its left hand end, the lever 8 is resiliently attached through a spring 11 to an adjustable member 12 which controls the setting of the governor 5 and consequently the amount of operating fluid admitted to the governor at a given speed. A pilot motor 13 and gears 14 and 15 are provided for adjusting the position of the member 12.

The pilot motor 13 is provided with oppositely wound field windings 16 and 17 and is arranged to be supplied with current through contact arm 19 pivoted at 20 and relay 21. Relay coils 22 and 23 are provided for controlling the position of the arm 19. The coil 22 is shown as connected to the line 18 through a resistor 24 arranged to control the current which it receives from the line and consequently the force with which it tends to move the contact arm 19 to the left. The coil 23 is arranged to exert on the core 26 a force tending to move the contact member 19 to its right hand position and is connected to the line 18 through rheostat 27 and a rheostat 28 which is adjusted in accordance with the position of the valve 4. It will be observed that with a constant current in the coil 22, the position of the contact arm may be controlled by manipulation of either of the rheostats 27 and 28.

In its right hand position, the contact arm 19 engages contacts 29 and 30. Through contact 30, the field winding 17 is connected to one side of the line 18 and through contact 29 the operating coil 31 of relay 21 is connected to the line 18. In its left hand position, the contact arm 19 engages the contacts 36 and 37, thereby connecting the field winding 16 to one side of the line 18 and otherwise making the same connections as when in its right hand position. A relay 32 having an operating coil 33 is provided for controlling the connection of the coil 31. The relays 21 and 32 are provided with dash pots 34 and 35 respectively for the purpose of delaying their closure a definite time after the energization of their operating coils. For the purpose of explaining the operation of my invention, it will be assumed that the relay 21 closes its contacts twenty seconds after energization of the coil 31 and that the relay 32 opens its contacts two seconds after the energization of the coil 33. The time delays of the relays 21 and 32 will of course be determined in each case by the characteristics of the device to be controlled.

Assuming the turbine to be operating and the contacts of the various relays to be in their illustrated positions, the setting of the gate 4 for a given turbine speed may be lowered by moving the contact arm of the rheostat 27 in a clockwise direction, thus reducing the resistance in the circuit of the relay coil 23 and causing the contact arm 19 to engage contacts 29 and 30. When this occurs, the coil 31 is connected to the line 18 through relay 32 and contact arm 19 and after an interval of twenty seconds, the relay 21 is moved to its closed position, thereby connecting the motor 13 and the operating coil 33 of the relay 32 across the line 18. The motor 13 is thereupon set in motion to adjust the member 12 to a higher position. This change in the position of the member 12 will operate through the spring 11 and levers 8, 10 and 6 to lower the turbine gate 4. As the gate 4 is lowered, the lever 6 also operates the resistor 28 to increase the resistance in series with the relay coil 23, thus reducing the force by which the contact arm 19 is held in engagement with the contacts 29 and 30. Since the connection between the motor 13 and the gate 4 is not rigid and since an appreciable time is required for the contact arm 19 to operate in response to adjustments of the rheostat 28, the gate 4 is apt to over-travel.

To prevent over-travel of the gate 4, the relays 21 and 32 are timed to operate in twenty and two seconds respectively, as previously explained. When the relay 21 has closed, both the motor 13 and the operating coil 33 of the relay 32 are energized. After an interval of two seconds, however, the relay 32 opens, thereby deenergizing the relay 21 which also disconnects the relay 32 and the motor 13 from the line 18. The contacts of the relay 32 then move to closed position and the relay 21 is again energized, but does not close for an interval of twenty seconds during which time the gate 4 has traveled to a position corresponding to that of the member 12 and the contact arm 19 has had time to move to its midposition if the current of the coil 23 has been reduced to a point where the forces exerted by the coils 22 and 23 are equal. If the arm 19 does not move to its midposition, however, the relay 21 again closes and is maintained closed for an interval of two seconds or until the contacts of the relay 32 have opened. In this manner, the gate is moved by the application of force in a series of impulses separated from one another by an interval of time sufficiently long to permit the gate to reach a position corresponding to the position of the actuating device before a subsequent impulse is applied. When the gate has reached a position corresponding to the position of the contact arm of the rheostat 27, the contact arm moves to midposition, and the governor, due to the fact that the left hand end of the lever 8 is supported in a higher position, maintains a lower position of the gate 4 for a given speed of the turbine 1.

The operations by which the gate 4 is set in a higher position for a given turbine speed are similar to those just described and will be readily understood without detailed explanation. To raise the gate 4, the contact arm of the rheostat 27 is moved in a counter-clockwise direction, thereby reducing the current supplied from the line 18 to the coil 23 and permitting the contact arm 19 to move into engagement with the contacts 36 and 37. This causes the field coil 16 to be energized and the motor 13 to be operated in a direction to lower the member 12 and raise the gate 4. As the gate 4 is raised, the resistance in series with the coil 23 is reduced by the resistor 28 and eventually, after a number of impulses dependent upon the magnitude of the change in the position of the valve, the contact arm 19 is returned to midposition and the left hand end of the arm 8 is supported in a lower position. It is apparent that the contact arm of the rheostat 27 may be operated either manually or automatically as by a water gauge, for example.

I have explained my invention by illustrating and describing a certain specific embodiment thereof, but it will be readily understood by those skilled in the art that it may be embodied in many other forms than those shown and described. I accordingly do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. The combination of a device which is apt to over-travel, and a system for controlling the operation of said device, said system comprising electroresponsive means for actuating said device, a time relay arranged when energized a relatively long interval of time for actuating contacts in the circuit of said actuating means, control means for effecting the energization of said relay, a second time delay relay arranged when energized a relatively short predetermined interval of time for effecting the deenergization of said first mentioned relay independently of said control means, and a circuit for said second time delay relay arranged to be completed through the contacts in the circuit of said actuating means which are actuated by said first mentioned relay.

2. In combination, an electric motor which is apt to over-travel, and means for preventing over-travel thereof including a circuit for said motor, contacts in said motor circuit, a relay for actuating said contacts, a circuit for said relay, contacts in said relay circuit, a second relay for actuating said contacts in said relay circuit, and a circuit for said second relay including said contacts in said motor circuit.

In witness whereof, I have hereunto set my hand this 8th day of May, 1924.

ELMER F. BLISS.